United States Patent
Khazanov et al.

(10) Patent No.: US 10,616,651 B2
(45) Date of Patent: Apr. 7, 2020

(54) EVENT BASED VIDEO GENERATION

(71) Applicant: PLAYSIGHT INTERACTIVE LTD., Kfar Saba (IL)

(72) Inventors: Evgeni Khazanov, Petah Tiqva (IL); Chen Shachar, Kohav Yair (IL)

(73) Assignee: PLAYSIGHT INTERACTIVE LTD., Kfar Saba (IL)

( * ) Notice: Subject to any disclaimer, the term of this patent is extended or adjusted under 35 U.S.C. 154(b) by 9 days.

(21) Appl. No.: 15/573,109

(22) PCT Filed: May 22, 2015

(86) PCT No.: PCT/IB2015/053800
§ 371 (c)(1),
(2) Date: Nov. 9, 2017

(87) PCT Pub. No.: WO2016/189347
PCT Pub. Date: Dec. 1, 2016

(65) Prior Publication Data
US 2018/0091858 A1    Mar. 29, 2018

(30) Foreign Application Priority Data
May 22, 2015  (WO) .................. PCT/IB2015/053800

(51) Int. Cl.
| | |
|---|---|
| *H04N 21/472* | (2011.01) |
| *H04N 21/2743* | (2011.01) |
| *H04N 21/414* | (2011.01) |
| *H04N 21/4223* | (2011.01) |
| *H04N 21/44* | (2011.01) |
| *H04N 21/45* | (2011.01) |
| *H04N 21/4788* | (2011.01) |

(Continued)

(52) U.S. Cl.
CPC ....... *H04N 21/472* (2013.01); *H04N 21/2343* (2013.01); *H04N 21/2743* (2013.01);
(Continued)

(58) Field of Classification Search
CPC ............. H04N 21/472; H04N 21/2343; H04N 21/2743; H04N 21/41407; H04N 21/4223;
(Continued)

(56) References Cited

U.S. PATENT DOCUMENTS

| | | | |
|---|---|---|---|
| 5,699,244 A | 12/1997 | Clark et al. | |
| 6,266,442 B1* | 7/2001 | Laumeyer | G06K 9/00818 382/104 |

(Continued)

FOREIGN PATENT DOCUMENTS

| | | |
|---|---|---|
| EP | 2775730 A1 | 9/2014 |
| WO | 2007/059301 A2 | 5/2007 |

OTHER PUBLICATIONS

International Search Report issued in PCT/IB2015/053800 dated Oct. 8, 2015 (2 pages), Applicant Playsight Interactive Ltd.
(Continued)

*Primary Examiner* — Nathan J Flynn
*Assistant Examiner* — Tung T Trinh
(74) *Attorney, Agent, or Firm* — Acuity Law Group, PC; Michael A. Whittaker

(57) ABSTRACT

A computer implemented method of event based video generation, comprising: on the device, receiving a feed of video captured by a camera, on a memory of the device, maintaining at least one buffer storing a most recent portion of the video feed being received, on a display of the device, presenting at least one GUI element, each one of the GUI elements being associated with a respective predefined video length, and upon actuation of one of the GUI elements by a user of the device, forwarding at least a sub-portion of the video feed portion stored in the buffer for further processing, the forwarded sub-portion having the predefined video length associated with the GUI element actuated by the user.

19 Claims, 6 Drawing Sheets

(51) Int. Cl.
  *H04N 21/845* (2011.01)
  *H04N 21/858* (2011.01)
  *H04N 21/854* (2011.01)
  *H04N 21/431* (2011.01)
  *H04N 21/84* (2011.01)
  *H04N 21/8549* (2011.01)
  *H04N 21/2343* (2011.01)

(52) U.S. Cl.
  CPC ... *H04N 21/41407* (2013.01); *H04N 21/4223* (2013.01); *H04N 21/4312* (2013.01); *H04N 21/44004* (2013.01); *H04N 21/4524* (2013.01); *H04N 21/4788* (2013.01); *H04N 21/84* (2013.01); *H04N 21/845* (2013.01); *H04N 21/8456* (2013.01); *H04N 21/854* (2013.01); *H04N 21/8549* (2013.01); *H04N 21/8586* (2013.01)

(58) Field of Classification Search
  CPC ......... H04N 21/44004; H04N 21/4524; H04N 21/4788; H04N 21/84; H04N 21/854
  See application file for complete search history.

(56) References Cited

U.S. PATENT DOCUMENTS

| | | | | |
|---|---|---|---|---|
| 6,438,314 B1* | 8/2002 | Akahane | H04N 5/783 | 386/278 |
| 7,181,757 B1* | 2/2007 | Kim | G11B 27/105 | 725/40 |
| 8,081,214 B2* | 12/2011 | Vanman | G08G 1/054 | 348/143 |
| 8,108,535 B1* | 1/2012 | Roberts | H04L 65/4092 | 709/231 |
| 8,311,382 B1 | 11/2012 | Harwell et al. | | |
| 8,358,345 B1* | 1/2013 | Fiore | H04N 5/76 | 348/157 |
| 8,676,027 B2* | 3/2014 | Hugosson | G08B 13/19669 | 386/228 |
| 8,776,158 B1* | 7/2014 | Cote | H04N 21/232 | 725/116 |
| 8,855,471 B2* | 10/2014 | Stone | G11B 27/034 | 386/278 |
| 8,875,022 B2* | 10/2014 | Yun | G06F 3/0481 | 715/716 |
| 9,094,738 B2* | 7/2015 | Kishore | H04N 21/23439 | |
| 2002/0049507 A1* | 4/2002 | Hameen-Anttila | H04N 21/25808 | 700/92 |
| 2002/0180774 A1* | 12/2002 | Errico | G11B 27/005 | 715/721 |
| 2003/0177503 A1* | 9/2003 | Sull | G06T 3/4092 | 725/112 |
| 2004/0109674 A1* | 6/2004 | Ohmori | G11B 27/034 | 386/253 |
| 2004/0255336 A1* | 12/2004 | Logan | H04H 20/28 | 725/135 |
| 2005/0002647 A1* | 1/2005 | Girgensohn | G11B 27/034 | 386/243 |
| 2005/0193408 A1* | 9/2005 | Sull | G11B 27/034 | 725/32 |
| 2005/0251835 A1* | 11/2005 | Scott, III | H04N 7/17318 | 725/88 |
| 2006/0020971 A1* | 1/2006 | Poslinski | H04N 5/44543 | 725/44 |
| 2007/0033170 A1* | 2/2007 | Sull | G06T 3/4092 | |
| 2007/0124679 A1* | 5/2007 | Jeong | G11B 27/28 | 715/723 |
| 2007/0217761 A1* | 9/2007 | Chen | H04N 5/772 | 386/228 |
| 2007/0281745 A1* | 12/2007 | Parkulo | G08B 21/02 | 455/557 |
| 2008/0062318 A1* | 3/2008 | Ellis | H04N 5/44543 | 348/564 |
| 2008/0211910 A1* | 9/2008 | Niem | G08B 13/19656 | 348/143 |
| 2008/0250080 A1* | 10/2008 | Arrasvuori | G06F 16/435 | |
| 2008/0285940 A1 | 11/2008 | Kulas | | |
| 2008/0304807 A1* | 12/2008 | Johnson | G06F 3/04847 | 386/278 |
| 2009/0034932 A1* | 2/2009 | Oisel | G11B 27/034 | 386/248 |
| 2009/0103898 A1* | 4/2009 | Morioka | G11B 27/034 | 386/248 |
| 2009/0110372 A1* | 4/2009 | Morioka | G11B 27/034 | 386/248 |
| 2009/0131177 A1* | 5/2009 | Pearce | A63F 13/10 | 463/43 |
| 2010/0077441 A1* | 3/2010 | Thomas | G06F 3/1415 | 725/133 |
| 2010/0123830 A1* | 5/2010 | Vunic | G06K 9/00711 | 348/700 |
| 2010/0275228 A1* | 10/2010 | Panje | G11B 27/034 | 725/38 |
| 2011/0040981 A1* | 2/2011 | Lindahl | H04H 20/40 | 713/189 |
| 2011/0096643 A1* | 4/2011 | Nakamura | G11B 7/0045 | 369/30.07 |
| 2011/0122255 A1* | 5/2011 | Haritaoglu | G06K 9/00711 | 348/180 |
| 2011/0293250 A1* | 12/2011 | Deever | G06K 9/00765 | 386/290 |
| 2011/0307914 A1* | 12/2011 | Blight | H04N 5/76 | 725/14 |
| 2012/0062473 A1* | 3/2012 | Xiao | H04N 5/76 | 345/173 |
| 2012/0066722 A1* | 3/2012 | Cheung | H04M 1/7253 | 725/62 |
| 2013/0288702 A1* | 10/2013 | Abu-Alqumsan | H04W 4/025 | 455/456.1 |
| 2013/0326406 A1* | 12/2013 | Reiley | G06F 3/048 | 715/810 |
| 2014/0123041 A1 | 5/2014 | Morse et al. | | |
| 2014/0146177 A1 | 5/2014 | Pacor et al. | | |
| 2014/0181668 A1* | 6/2014 | Kritt | G06F 3/0484 | 715/719 |
| 2014/0223482 A1* | 8/2014 | McIntosh | G11B 27/105 | 725/41 |
| 2014/0245367 A1* | 8/2014 | Sasaki | H04N 21/4402 | 725/109 |
| 2014/0300739 A1* | 10/2014 | Mimar | H04N 7/188 | 348/148 |
| 2014/0349750 A1* | 11/2014 | Thompson | A63F 13/12 | 463/31 |
| 2015/0163320 A1* | 6/2015 | Hu | H04L 67/2852 | 709/214 |
| 2015/0248917 A1* | 9/2015 | Chang | H04N 21/8549 | 386/282 |
| 2015/0262616 A1* | 9/2015 | Jaime | G11B 27/034 | 386/228 |
| 2015/0312621 A1* | 10/2015 | Le Garjan | H04N 21/4147 | 386/295 |
| 2016/0182415 A1* | 6/2016 | Ames | G06F 16/9535 | 715/752 |
| 2016/0261929 A1* | 9/2016 | Lee | G06K 9/00724 | |

OTHER PUBLICATIONS

Written Opinion issued in PCT/IB2015/053800 dated Oct. 8, 2015 (7 pages), Applicant Playsight Interactive Ltd.

* cited by examiner

EVENT BASED VIDEO GENERATION

CROSS-REFERENCE TO RELATED APPLICATIONS

The present invention is filed under 35 U.S.C. § 371 as the United States national phase of International Application No. PCT/IB2015/053800, filed May 22, 2015, which designated the United States and which is hereby incorporated in its entirety including all tables, figures, and claims.

FIELD AND BACKGROUND OF THE INVENTION

The present invention relates to video capture, generation and editing, and more particularly, but not exclusively to a system and method for event based video generation.

Today, at public performances, tennis games, football games, seminars, classes, lectures, speeches, etc., it has become increasingly popular for a member of the audience, to capture still images and video sequences using a camera installed on a device (say a smart phone or a tablet computer) in use by the audience member, using a camera wirelessly connected to the member's device, etc., as known in the art.

Often, at a later stage, the member of the audience may watch the captured video sequences or images, say on a screen of the device, on a screen of a smart TV set or of a laptop computer, etc., edit the video, etc., as known in the art.

The member may forward the images to a friend, a family member, or a colleague, say by email. In that way, the member may share moments of interest caught in the images with friends, family, colleagues, etc.

The member may also upload the video to one of the many popular public Social Networking websites—such as YouTube, thus sharing the moments of interest with friends, family, colleagues, or a more general public.

Indeed, Social Networking is an increasingly popular tool for distributing personalized videos, because it provides a unified platform for communicating with friends, family, coworkers, and even the general public. Today, users can more easily connect to social networking using smart phones, tablet computers, etc.

It has thus become increasingly popular to use personalized video recordings, for a variety of purposes, be the purposes, social, educational, professional, etc.

SUMMARY OF THE INVENTION

According to one aspect of the present invention there is provided a computer implemented method of event based video generation, the method comprising steps a computer processor of a device is programmed to perform, the steps comprising: on the device, receiving a feed of video captured by a camera, on a memory of the device, maintaining at least one buffer storing a most recent portion of the video feed being received, on a display of the device, presenting at least one GUI (Graphical User Interface) element, each one of the GUI elements being associated with a respective predefined video length, and upon actuation of one of the GUI elements by a user of the device, forwarding at least a sub-portion of the video feed portion stored in the buffer for further processing, the forwarded sub-portion having the predefined video length associated with the GUI element actuated by the user.

According to a second aspect of the present invention there is provided an apparatus for event based video generation, the apparatus being implemented on a device and comprising: a video feed receiver, configured to receive a feed of video captured by a camera; a buffer maintainer, in communication with the video feed receiver, configured to maintain at least one buffer storing a most recent portion of the video feed being received, on a memory of the device; a GUI element presenter, configured to present at least one GUI (Graphical User Interface) element on a display of the device, each one of the GUI elements being associated with a respective predefined video length; and a forwarder, in communication with the GUI element presenter, configured to forward at least a sub-portion of the video feed portion stored in the buffer for further processing, upon actuation of one of the GUI elements by a user of the device, the forwarded sub-portion having the predefined video length associated with the GUI element actuated by the user.

According to a third of the present invention there is provided a non-transitory computer readable medium storing computer executable instructions for performing steps of event based video generation, on a device, the steps comprising: on the device, receiving a video feed captured by a camera; on a memory of the device, maintaining at least one buffer storing a most recent portion of the video feed being received; on a display of the device, presenting at least one GUI (Graphical User Interface) element, each one of the GUI elements being associated with a respective predefined video length; upon actuation of one of the GUI elements by a user of the device, forwarding at least a sub-portion of the video feed portion stored in the buffer for further processing, the forwarded sub-portion having the predefined video length associated with the GUI element actuated by the user.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings.

With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings:

FIG. 1 is a block diagram schematically illustrating an exemplary apparatus for event based video generation, according to an exemplary embodiment of the present invention.

FIG. 2 is a simplified flowchart schematically illustrating an exemplary method for event based video generation, according to an exemplary embodiment of the present invention.

FIG. 3 is a block diagram schematically illustrating a first exemplary GUI of an apparatus for event based video generation, according to an exemplary embodiment of the present invention.

FIG. 4 is a block diagram schematically illustrating a second exemplary GUI of an apparatus for event based video generation, according to an exemplary embodiment of the present invention.

FIG. 5 is a block diagram schematically illustrating computer memory buffer usage in performing steps of event based video generation, according to an exemplary embodiment of the present invention.

FIG. 6 is a block diagram schematically illustrating an exemplary computer readable medium storing computer executable instructions for performing steps of event based video generation, according to an exemplary embodiment of the present invention.

DESCRIPTION OF THE PREFERRED EMBODIMENTS

Figure 1:
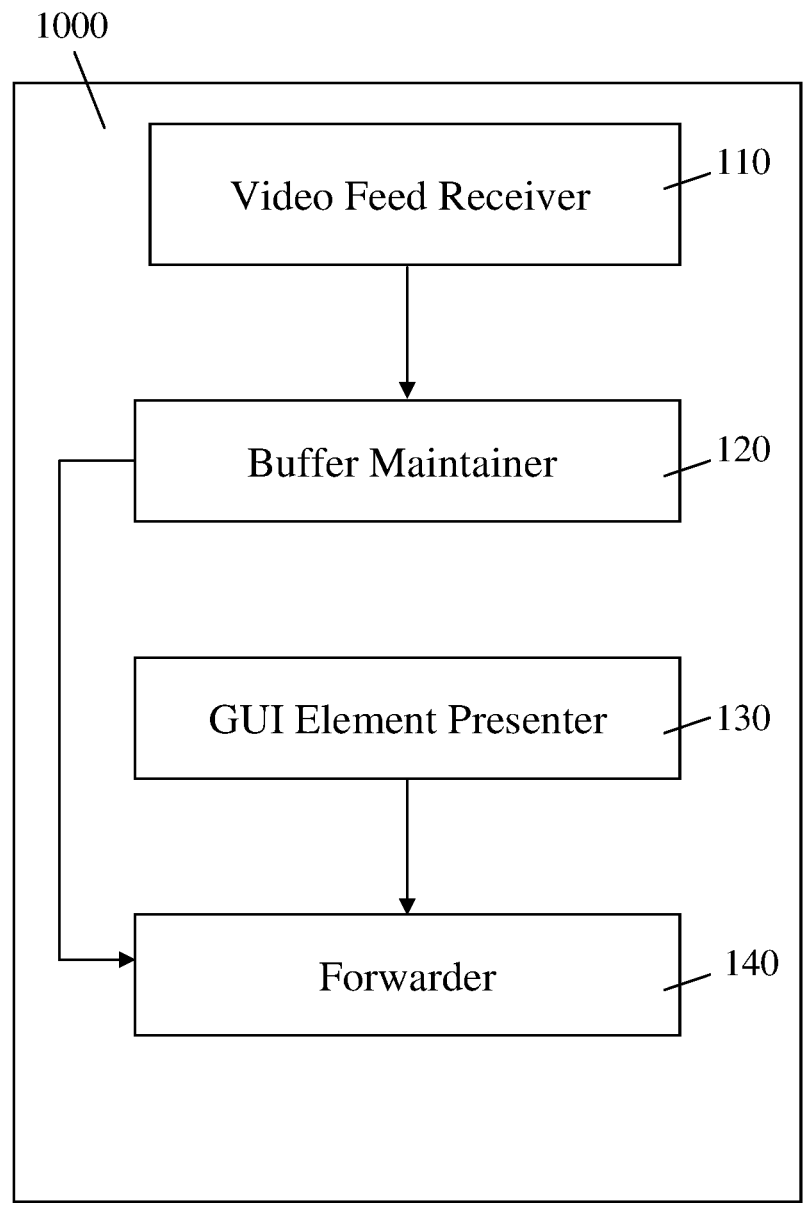

The present embodiments comprise an apparatus and a method for event based video generation.

Today, it has become increasingly popular for a member of the audience, at public performances, tennis games, football games, seminars, classes, lectures, speeches, etc., to capture still images and video sequences. The member captures the video or still images using a camera installed on a device (say on a smart phone or a tablet computer) in use by the audience member, using a camera wirelessly connected to the device, etc., as known in the art.

In as far as still images are concerned, smart phones and small sized tablet computers, have made it easier for unskilled photographers to capture interesting moments in images and share those images with their friends and the world, immediately or almost immediately after capturing the images.

The member (typically, an unskilled photographer) may thus use his smart phone or tablet computer, for taking dozens or more stills images, and then select among the images, an image which is better framed, thus giving the impression of being a talented photographer who manages to catch an exact moment of interest.

In addition, the member may use smart phone applications to further improve the artistic quality of the selected image by applying image filters that may blur edges of the image or alter colors, thereby further increasing the artistic nature of the image selected by the member.

Video, however, is a string of many related frames or images and does not lend itself to similar selection of the best images. When sections or parts of a video captured during a sport game, etc., are shaky, blurry, poorly framed and the like, the only practical remedy available today is one of editing out of the bad parts, after the game.

Video further involves complications resultant upon a need for an appropriate and well-timed capturing. For example, the member of the audience may use his mobile smart phone, to continuously capture a video of a Soccer Game, of which only very specific moments (say a goal by his son playing in one of the teams) are of real interest to the member (say mother) and friends.

Further, an immediate forwarding of the video would require continuous video streaming over a cellular network, which streaming would be limited significantly, by the bandwidth currently provided to users of cellular networks.

Thus, currently, after the game, the member of the audience would usually download the video to a personal computer (say laptop computer), edit the captured video—editing out bad or boring parts, and leaving only a moment of interest to the member.

Subsequently, the member may forward the video to a friend, a family member, or colleague—say by email, or upload the video to one of the many popular public Social Networking websites.

In that way, the member may share moments of interest caught in the video (say a particular participant's performance such as a goal by a popular soccer player or the member's son) with friends, family, etc.

Potentially, with presented embodiments of the present invention, the sharing of video with friends, family, etc., may be turned into a more spontaneous experience, with possibly, an immediate or an almost immediate forwarding of moments of interest video to friends, family, etc.

In one exemplary embodiment, on a user's device such as a mobile smart phone or a tablet computer, there is received a feed of video captured by a camera—be the camera a camera installed on the device itself, or rather a camera in communication with the device (say a wireless action camera).

As the video feed captured by a camera is being received, there are maintained one or more buffers in which the received video's frames are stored, say in a first-in, first-out manner, such that at least one of the buffers stores a most recent portion of the video feed being received.

In one example, the buffer stores the most recent five minutes of the video being received.

During receipt of the video feed, there are also presented on a display of the device, one or more GUI (Graphical User Interface) elements—say a few radio buttons or menu options.

Each one of the GUI elements is associated with a respective predefined video length.

Optionally, the video length is predefined for each one of the GUI elements specifically, in a preliminary step of GUI element definition by a user of the device, by an administrator of a server computer in remote communication with the device, or by a programmer, as described in further detail hereinbelow.

In the exemplary embodiment, each one of the GUI elements is further associated with a respective event type—which is also predefined by the user, administrator or programmer, for the specific GUI element.

Further in the exemplary embodiment, each one of the GUI elements is presented to the user, on the user's device, with a marking which indicates the association of the GUI element with the respective event type predefined for the GUI element.

Thus, in one example, per the predefined event types, during a game of Soccer, one GUI radio button presented to the user bears the word 'Goal', one GUI radio button presented to the user bears the word 'Offside', and one GUI radio button presented to the user bears the word 'Attack'.

Upon actuation of one of the GUI elements by a user of the device —say by touching one of the GUI radio buttons, there is forwarded a sub-portion of the video feed portion stored in the buffer for further processing (say the five minutes buffer of the above made example).

In the example, upon that actuation, the sub-portion is communicated to a server computer remote from the user's device, on which server computer the sub-portion is further processed by conversion into a video clip, and is distributed as an email attachment, to a list of recipients predefined for the specific user's device.

The forwarded sub-portion is of a video length associated with the GUI element actuated by the user—say the video length predefined specifically for the radio button pushed by the user.

Thus, in the example, when a player scores a goal, the user actuates the radio button which bears the word 'Goal', and a sub-portion made of the last twenty seconds of the five minutes stored in the buffer maintained on the user's device, is forwarded by communication to the remote server computer.

However, when the user actuates the radio button which bears the word 'Attack', there is forwarded a sub-portion made of the last one minute of the five minutes stored in the buffer.

Consequently, the video clip distributed as an email attachment, to the list of recipients predefined for the specific user's device, is focused at the very specific moment of interest to the user (say the goal or the attack which led to the goal). Further, bandwidth consumed by the user is reduced to the bandwidth needed for the twenty seconds or one minute long video sub-portions of interest to the user.

In another example, the user is sent a message (say an email message) bearing a link usable for downloading the video clip from the remote computer server, which message the user may forward directly to one or more recipient.

The principles and operation of an apparatus, method, and medium according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1, which is a block diagram schematically illustrating an exemplary apparatus for event based video generation, according to an exemplary embodiment of the present invention.

An apparatus 1000 for event based video generation, according to an exemplary embodiment of the present invention includes a device such as a smart mobile phone or a tablet computer, which is equipped with a computer processor as well as with other hardware and software components. For example, the device may include hardware and software components which are usable for communicating over a network such as the internet, over a Wi-Fi connection, over a Bluetooth™ connection, etc., as known in the art.

The apparatus 1000 further includes one or more additional parts, such as the parts denoted 110-140 in FIG. 1.

The additional parts 110-140 may be implemented as software—say by programming the computer processor to execute steps of the method described in further detail hereinbelow, as hardware—say as an electric circuit, or as a combination of hardware and software.

For example, the apparatus 1000 may be implemented as a computer application such an iPhone App, which may be downloaded and installed on the user's smart cellular phone (say an Apple® iPhone or a Samsung® Galaxy cellular phone) or tablet computer.

Thus, the apparatus 1000 includes a video feed receiver 110 implemented on the device.

On the device, the video feed receiver 110 receives a feed of video captured by a camera—say a video feed captured by the device's user using a camera installed on the device, a video feed wirelessly streamed live to the user's device from an action camera installed in a tennis court, etc.

The apparatus 1000 further includes a buffer maintainer 120 in communication with the video feed receiver 110.

During the receiving of the video feed by the video feed receiver 110, the buffer maintainer 120 maintains one or more buffers on a memory of the device.

At least one of the buffers stores a most recent portion of the video feed being received by the video feed receiver 110—say the last five minutes of the video feed being received, as described in further detail hereinbelow.

The apparatus 1000 further includes a GUI (Graphical User Interface) element presenter 130.

The GUI element presenter 130 presents one or more GUI (Graphical User Interface) elements—say radio buttons, check boxes, options in a menu, etc., as known in the art, on a display of the user's device.

Each one of the GUI elements is associated with a respective video length predefined by a user of the device, by a programmer of the application downloaded to the user's device, by an administrator of a remote computer in communication with the user's device, etc., as described in further detail hereinbelow.

The apparatus 1000 further includes a forwarder 140 in communication with the GUI element presenter 130.

Upon actuation of one of the GUI elements by the user of the device—say by clicking or touching the GUI element, the forwarder 140 forwards a sub-portion of the video feed portion stored in one of the buffers for further processing.

The forwarded sub-portion's has the video length associated with the GUI element actuated by the user, and predefined by the user, programmer, or administrator, etc., for the specific GUI element, as described in further detail hereinabove.

Thus, by actuating one of the GUI Elements, the user implicitly or explicitly, chooses the size (say time length) of the video sub-portion forwarded by the forwarder 140, for further processing, as described in further detail hereinbelow.

Optionally, the forwarder 140 forwards the sub-portion by communicating the sub-portion to a server computer remote from the device (say to a service provider's computer in remote communication with the user's device).

Optionally, the forwarder 140 communicates the sub-portion over the internet or over another computer network, which the device accesses through a Wi-Fi connection, through a connection provided by a mobile carrier, etc., as known in the art.

In one example, on the server computer, the sub-portion is further processed by conversion into a content item such as a video clip.

Optionally, in the example, the video clip may be distributed to one or more recipients directly from the server computer, using a recipients list predefined by the user through remote access to the server computer, say on a website implemented on the server computer, as known in the art.

Alternatively, the video clip may be distributed indirectly, using an email message which bears a link usable for downloading the video clip from the server computer, and is sent to the user. The user in turn, may forward the email to one or more recipients, as described in further detail hereinbelow.

Optionally, the apparatus 1000 further includes a video presenter in communication with the forwarder 140, and the forwarder 140 rather forwards the sub-portion to the video presenter. The video presenter in turn, further processes the sub-portion, by presenting the sub-portion on a screen of the user's device, thus playing the sub-portion of interest directly, to the user himself.

Optionally, the apparatus 1000 further includes a camera installed on the user's device, and the user captures the video feed himself, using the device's own camera, as described in further detail hereinabove.

Optionally, the apparatus 1000 further includes a driver application usable for controlling a camera in communication with the user's device, say over a wireless connection, as known in the art. For example, the apparatus 1000 may include a driver application in communication with an action camera (say a GoPro® Camera, for capturing the video feed, as known in the art.

Optionally, the GUI element presenter 130 presents each one of the GUI elements with a marking which indicates an association of the GUI element with a respective event type, as described in further detail hereinbelow.

Each one of the event types is predefined, for a specific one of the GUI elements, say by the user, administrator or programmer, as described in further detail hereinbelow.

Thus, in one example, per the predefined event types, during a game of Soccer, one GUI radio button presented to the user, bears the word 'Goal', one GUI radio button presented to the user, bears the word 'Offside', one radio button presented to the user, bears the word 'Attack ', etc., as described in further detail hereinbelow.

In the example, when a player scores a goal which is captured in the video feed received by the video feed receiver 110, the user may actuate the GUI radio button which bears the word 'Goal'. Upon the actuation of the radio button by the user, the forwarder 140 communicates a sub-portion made of the last twenty seconds of the video feed stored in the buffer, to a remote server computer.

However, in the example, when the user rather actuates the GUI radio button which bears the word 'Attack', the forwarder 140 communicates a longer sub-portion made of the last one minute of the video feed stored in the buffer, to the remote server computer.

Optionally, the apparatus 1000, further includes a definition generator, which selects one or more of the video lengths, one or more of the GUI elements, one or more of the event types associated with a respective one of the GUI elements, or any combination thereof, based on a location of the device, on data input by the user of the device, or on both the location and the user input data.

Optionally, the definition generator allows a user to define an association between at least one of the GUI elements and a respective video length.

Optionally, the definition generator allows a user to define an association between at least one of the GUI elements and a respective event type.

Optionally, the definition generator receives definition data which defines one or more of the video lengths, one or more of the GUI elements, one or more of the event types associated with a respective one of the GUI elements, or any combination thereof from a server computer remote from the device, as described in further detail hereinbelow.

The definition data received by the definition generator may include definitions already embedded in the application on which parts 110-140 are implemented, when the application is downloaded from a remote server of an App Store—such as Apple® App Store or Google® Play.

Alternatively or additionally, the received definition data may include definitions communicated to the definition generator (say a module of the downloaded application), from a remote server computer, say a remote server computer in use by a cloud based service provider.

In a first example, the definition generator forwards data generated on the user's device based on a signal received by the user's device to a server computer remote from the user's device, say the service provider's server computer.

The data generated based on the signal may include, but is not limited to: GPS (Global Positioning System) data, DGPS (Differential Global Positioning System) data, another location data, etc., or any combination thereof, as known in the art.

Consequently, on the remote server computer, based on the data forwarded to the server computer, the server computer generates data which defines one or more of the video lengths, one or more of the GUI elements, one or more of the event types associated with a respective one of the GUI elements, or any combination thereof.

The data generated on the server computer is sent by the server computer, to the user's device, and received by the definition generator, which in turn, forwards the data to the GUI element presenter 130, to the forwarder 140, or to both.

In a second example, the definition generator allows a user of the device to input a sport type, and based on the input sport type, the definition generator automatically selects one or more of the video lengths, one or more of the GUI elements, one or more of the event types associated with a respective one of the GUI elements, or any combination thereof.

Optionally, in the second example, the definition generator uses definition data already embedded in the application on which the parts 110-140 are implemented when the application is downloaded, say from the App Store.

Alternatively or additionally, the definition generator communicates with a remote computer, for receiving the definition data, as described in further detail hereinabove.

In a third example, the definition generator allows the user of the device to input a code—say a code given to the user at a stadium at which a Football Match attended by the user takes place, and forwards the code input by the user to a server computer remote from the device.

Consequently, on the remote server computer, there is generated definition data which defines one or more of the video lengths, one or more of the GUI elements, one or more of the event types associated with a respective one of the GUI elements, or any combination thereof. The generated definition data is sent to the user's device, and received by definition generator, which forwards the definition data to the GUI element presenter 130, the forwarder 140, or to both.

The apparatus 1000 may further include a content forwarder.

Optionally, the content forwarder receives from the remote server computer, a link usable for accessing a content item based on the sub-portion communicated to the server computer—say a video clip, and allows the user to forward the received link to one or more recipients, as described in further detail hereinabove.

Optionally, the content item (say the video clip) is further based on video data received on the server computer from at least one second device in predefined proximity to the first device.

For example, the content may be based on the video sub-portion received on the server computer from the user's device, combined (say by video concatenation) with a video sub-portion received from a second device. The sub-portions may be combined based on GPS data received from both devices, and a digital map available on the server computer—which show that the two devices are present simultaneously within the area of a same sport facility, say a same tennis stadium.

Figure 2:
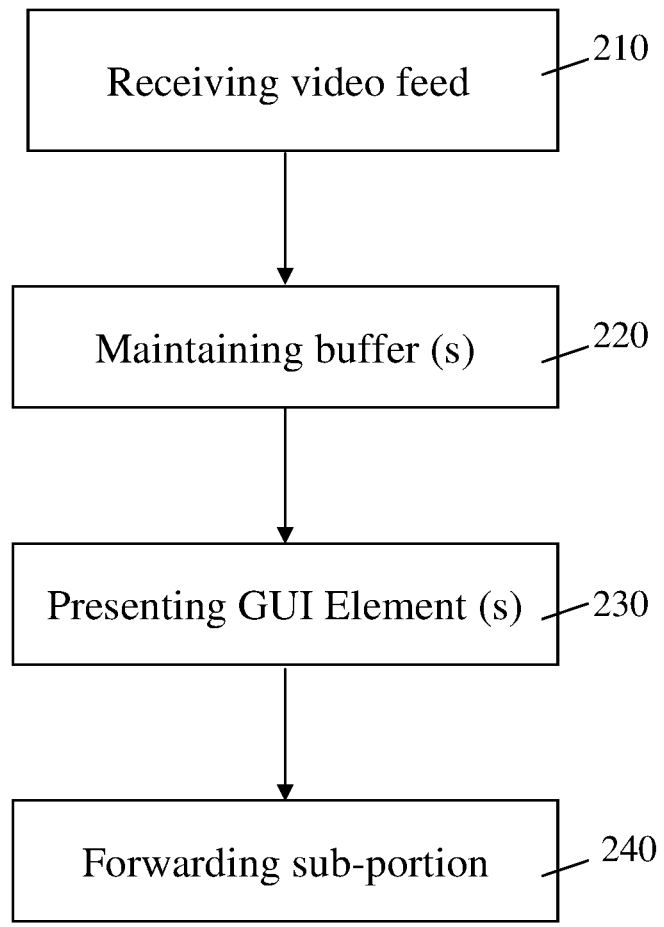

Reference is now made to FIG. 2, which is a simplified flowchart schematically illustrating an exemplary method for event based video generation, according to an exemplary embodiment of the present invention.

An exemplary method for event based video generation, according to an exemplary embodiment of the present invention, may be executed by a computer processor of a device.

The device may include but is not limited to a smart cellular phone (say an Apple® iPhone or a Samsung® Galaxy cellular phone) or a tablet computer (say an Apple® iPad).

In a first example, for carrying out the exemplary method, the device communicates with one or more cameras (say with an action camera), for receiving a video feed captured live during a game of sport, a seminar, a lecture, a speech, etc., as described in further detail hereinabove.

In a second example, the video feed is rather captured by a user of the device, using a camera installed on the device itself (say a smart phone camera), during a game of sport, a seminar, a lecture, a speech, etc., as described in further detail hereinabove.

Thus, in the method, there is received 210 the feed of video captured by the camera—say a video feed which the user captures himself using a camera installed on the user's device (say the user's smart phone), a video feed wirelessly streamed live to the user's device from an action camera installed in a tennis court, etc. Optionally, the video feed is received 210 by the video feed receiver 110, as described in further detail hereinabove.

During the receiving 210 of the video feed, there are maintained 220 one or more buffers on a memory of the device, say by the buffer maintainer 120, as described in further detail hereinabove.

At least one of the buffers stores a most recent portion of the video feed being received 210—say the last five minutes of video received by the video feed receiver 110, as described in further detail hereinbelow.

Optionally, throughout at least a part of the receiving 210 of the video, there are maintained two buffers which span partially overlapping time frames, as described in further detail hereinbelow, and illustrated by FIG. 5.

During the receipt 210, there are further presented 230 one or more GUI (Graphical User Interface) elements—say radio buttons, check boxes, options in a menu, etc., as known in the art, on a display of the user's device, say by the GUI element presenter 130, as described in further detail hereinabove.

Each one of the GUI elements is associated with a respective video length predefined by a user of the device, by a programmer of the application downloaded to the user's device, by an administrator of a remote computer in communication with the user's device, etc., as described in further detail hereinabove.

Upon actuation of one of the GUI elements by the user of the device—say by clicking or touching the GUI element, there is forwarded 240 a sub-portion of the video feed portion stored in one of the buffers for further processing, from the buffer, say by the forwarder 140, as described in further detail hereinabove.

The forwarded 240 sub-portion's has the video length associated with the GUI element actuated by the user, and predefined by the user, programmer, or administrator, etc., for the specific GUI element, as described in further detail hereinabove.

Thus, by actuating one of the GUI Elements, the user implicitly or explicitly, chooses the size (say time length) of the video sub-portion forwarded 240 for further processing, as described in further detail hereinbelow.

Optionally, the sub-portion is forwarded 240 by communicating the sub-portion to a server computer remote from the device (say to a service provider's computer in remote communication with the user's device), as described in further detail hereinabove.

For example, the sub-portion may be communicated 240 over the internet or over another computer network, which the user's device accesses through a Wi-Fi connection, through a connection provided by a mobile carrier, etc., as known in the art.

In one example, on the server computer, the sub-portion is further processed by conversion into a content item such as a video clip.

Optionally, in the example, the video clip may be distributed to one or more recipients directly, from the server computer, using a recipients list predefined by the user through remote access to the server computer, say on a website implemented on the remote computer, as described in further detail hereinabove.

Alternatively, the video clip may be distributed indirectly, using an email message which bears a link usable for downloading the video clip from the server computer, and is sent to the user. The user in turn, may forward the email to one or more recipients, as described in further detail hereinabove.

Optionally, the sub-portion is rather forwarded 240 for further processing by presenting of the sub-portion on a screen of the user's device, say by the video presenter, thus playing the sub-portion of interest directly, to the user himself.

Optionally, the method further includes a capturing of the video feed by the user himself, using the device's own camera, as described in further detail hereinabove.

Optionally, the method further includes controlling a camera (say an action camera) in communication with the user's device, say over a wireless connection, using a dedicated application—say a driver application in communication with the camera, for capturing the video feed, as known in the art.

Optionally, each one of the GUI elements is presented 230 (say by the GUI element presenter 130) with a marking which indicates an association of the GUI element with a respective event type, as described in further detail hereinbelow.

Each one of the event types may be predefined for a specific one of the GUI elements, say by the user, administrator or programmer, as described in further detail hereinabove.

Thus, in one example, per the predefined event types, during a game of Soccer, one GUI radio button presented 230 to the user, bears the word 'Goal', one GUI radio button presented 230 to the user, bears the word 'Offside', one radio button presented 230 to the user, bears the word 'Attack', etc., as described in further detail hereinbelow.

In the example, when a player scores a goal which is captured in the received 210 video feed, the user may actuate the GUI radio button which bears the word 'Goal'. Upon the actuation of the radio button by the user, the forwarder 140 communicates 240 a sub-portion made of the last twenty seconds of the video feed stored in the buffer, to a remote server computer.

However, in the example, when the user rather actuates the GUI radio button which bears the word 'Attack', the forwarder 140 communicates 240 a sub-portion made of the last one minute of the video feed stored in the buffer, to the remote server computer.

Optionally, there are selected one or more of the video lengths, one or more of the GUI elements, one or more of the event types associated with a respective one of the GUI elements, or any combination thereof, based on the device's location, on data input by the device's user, or on both, say by the definition generator, as described in further detail hereinabove.

Optionally, the user is allowed, say by the definition generator, to define an association between at least one of the GUI elements and a respective video length.

Optionally, the user is allowed, say by the definition generator, to define an association between at least one of the GUI elements and a respective event type.

Optionally, there is received, say by the definition generator, definition data which defines one or more of the video lengths, one or more of the GUI elements, one or more of the event types associated with a respective one of the GUI elements, or any combination thereof, from a server computer remote from the device.

The received definition data may include definitions already embedded in the application downloaded from a remote server computer—say a server computer of an App Store (say from the Apple® App Store), or of a service provide, as described in further detail hereinabove.

Alternatively or additionally, the received definition data may include definitions communicated from a remote server—say a remote server of a service provider, say upon opening the downloaded application, just before a game which the user intends to capture with his smart phone's video camera, as described in further detail hereinabove.

In one example, data generated on the user's device based on a signal received by the user's device is forwarded (say by the definition generator) to a server computer remote from the user's device.

The data generated on the user's device may include, but is not limited to: GPS (Global Positioning System) data, DGPS (Differential Global Positioning System) data, another location data, etc., or any combination thereof, as known in the art.

Consequently, on the remote server computer, based on the data forwarded to the server computer, the server computer generates definition data which defines one or more of the video lengths, one or more of the GUI elements, one or more of the event types associated with a respective one of the GUI elements, or any combination thereof.

The definition data generated on the server computer is sent by the server computer, to the user's device, received (say by the definition generator) on the device, and is forwarded for use in the presenting 230 of the GUI elements, in the forwarding 240 of the sub-portion (say for setting the sub-portion's length), or in both the presenting 230 and the forwarding 240, as described in further detail hereinabove.

In a second example, the a user of the device is allowed (say by the definition generator) to input a sport type, and based on the input sport type, there are automatically selected one or more of the video lengths, one or more of the GUI elements, one or more of the event types associated with a respective one of the GUI elements, or any combination thereof.

Optionally, in the second example, there are used (say by the definition generator), the definitions already embedded in the application on which the apparatus 1000's parts 110-140 are implemented when the application is downloaded, say from the App Store, as described in further detail hereinabove.

Alternatively or additionally, a remote computer is communicated with (say by the definition generator), for receiving the definitions, as described in further detail hereinabove.

In a third example, the user of the device is allowed to input a code—say a code given to the user at a stadium at which a Football Match attended by the user takes place, and the user-input code is forwarded to a server computer remote from the device.

Consequently, on the remote server computer, there is generated definition data which defines one or more of the video lengths, one or more of the GUI elements, one or more of the event types associated with a respective one of the GUI elements, or any combination thereof.

The generated definition data is sent to the user's device, received (say by the definition generator), and forwarded for use in the presenting 230 of the GUI elements, in the forwarding 240 of the sub-portion (say for setting the sub-portion's length), or in both the presenting 230 and the forwarding 240.

Optionally, there is received from the remote server (say by the content forwarder), a link usable for accessing a content item (say a video clip) based on the sub-portion communicated to the server computer, and the user is allowed to forward the received link to one or more recipients, as described in further detail hereinabove.

Optionally, the content item (say the clip) is further based on video data received on the server computer from at least one second device in predefined proximity to the first device.

For example, the content may be based on the video sub-portion received on the server computer from the user's device, combined (say by video concatenation) with a video sub-portion received from a second device. The sub-portions may be combined based on GPS data received from both devices, and a digital map available on the server computer—which show that the two devices are present simultaneously within the area of a same sport facility, say a same tennis stadium.

Figure 3:
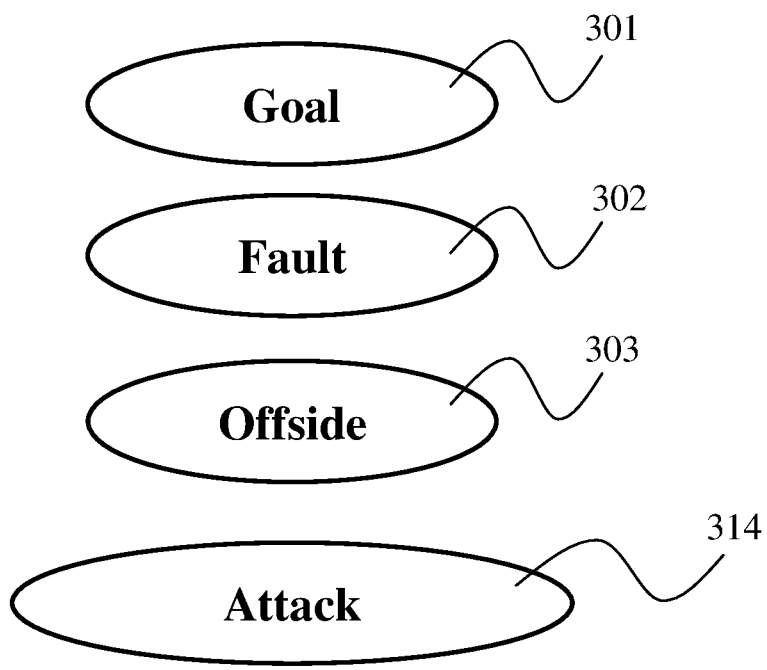

Reference is now made to FIG. 3, which is a block diagram schematically illustrating a first exemplary GUI of an apparatus for event based video generation, according to an exemplary embodiment of the present invention.

In one exemplary embodiment, during a game of Soccer between FC Barcelona and Real Madrid attended by a fan, on the fan's mobile smart phone, there is received, say by the video feed receiver 110 of apparatus 1000, a feed of video captured by fan himself, using the smart phone's camera.

As the video feed captured by a camera is being received, there are maintained one or more buffers, say by the buffer maintainer 120, as described in further detail hereinabove.

In the exemplary embodiment, the buffer stores the most recent ten minutes of the video being received.

During receipt of the video feed, there are presented on a display of the fan's mobile smart phone, say by the GUI element presenter 130 of apparatus 1000, in a GUI (Graphical User Interface), one or more GUI elements 301-314 (say a few buttons, menu options, etc.), as known in the art.

Each one of the GUI elements 301-314 is associated with a respective predefined video length.

Optionally, the video length is predefined for each one of the radio buttons specifically, in a preliminary step of radio button definition by the fan, by an administrator of a server computer in remote communication with the smart phone, or by a programmer, as described in further detail hereinabove.

In the exemplary embodiment, each one of the GUI elements 301-314 is further associated with a respective event type—which is also predefined by the user, administrator or programmer, for the specific GUI element.

Each one of the GUI elements 301-314 is presented to the fan, on the screen of fan's smart phone, with a marking which indicates the association of the GUI element with the respective event type predefined for the GUI element.

Thus, in the example, per the predefined event types, during the game, one GUI element 301 bears the word 'Goal', one GUI element bears the word 'Fault' 302, one GUI element 303 bears the word 'Offside' 314, and one GUI element 301 bears the word 'Attack'.

Upon actuation of one of the GUI elements 301-314 by the fan—say by touching one of the GUI's radio buttons 301-314, there is forwarded a sub-portion of the video feed portion stored in the buffer, by communication, to a server computer remote from the smart phone.

The forwarded sub-portion is of a video length associated with the GUI element actuated by the user—say the video length predefined specifically for the GUI element (say button) touched by the fan.

Thus, in the example, when one of the players scores a goal, the fan actuates (say by touching) the button which bears the word 'Goal', and a sub-portion made of the last one twenty seconds of the ten minutes stored in the buffer maintained on the user's device, is forwarded by communication to the remote server computer.

However, when Barcelona's Lional Messi scores a goal, and the fan wishes a longer sub-portion which hopefully, captures the whole Barcelona attack which leads to the goal scoring, the fan rather actuates the button which bears the word 'Attack'. Consequently, a sub-portion made of the last one minute of the ten minutes stored in the buffer, is forwarded by communication to the remote server computer.

Then, on the server computer, the sub-portion is further processed by conversion into a video clip. Optionally, the video clip is added titles which describe the type of event (say 'Goal' or 'Attack') associated with the GUI element actuated by the fan, as well as additional titles such as 'Real Madrid vs. FC Barcelona', a date, etc.

Finally, the server computer sends an email message which bears a link usable for downloading the video clip to the fan's smart phone, and the fan forwards the email message to one or more recipients.

The video clip distributed as an email attachment, to the recipient, is thus focused at the very specific moments of interest to the user (say goals and attacks by the fan's favorite team). Further, bandwidth consumed by the fan's smart phone is reduced to the bandwidth needed for the twenty seconds or one minutes long video sub-portions of interest to the fan.

Figure 4:
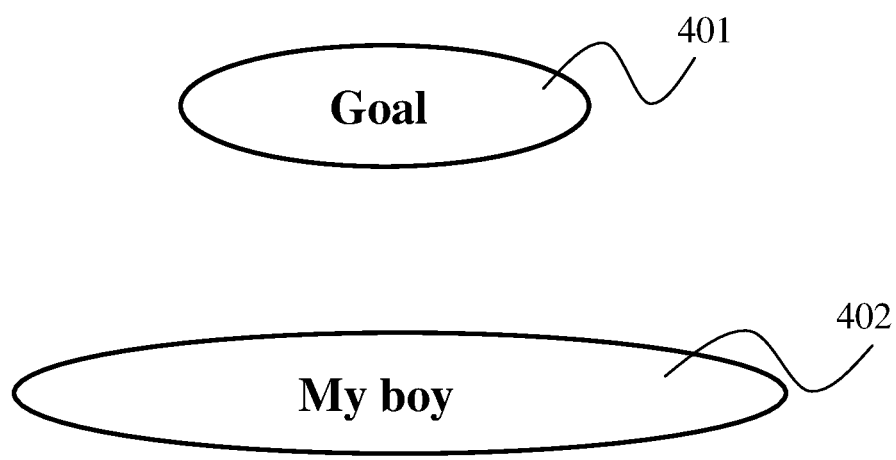

Reference is now made to FIG. 4, which is a block diagram schematically illustrating a second exemplary GUI of an apparatus for event based video generation, according to an exemplary embodiment of the present invention.

In one exemplary embodiment, a mother attends an amateur Football Game between two schools, at a stadium.

During the game, on the mother's mobile smart phone, there is received, say by the video feed receiver 110 of apparatus 1000, a feed of video captured by a camera wirelessly connected to the mother's mobile smart phone.

As the video feed captured by a camera is being received, there are maintained one or more buffers, say by the buffer maintainer 120, as described in further detail hereinabove.

In the exemplary embodiment, at least on of the buffers stores the most recent five minutes of the video being received.

During receipt of the video feed, there are presented on a display of the mother's mobile smart phone, say by the GUI element presenter 130 of apparatus 1000, in a GUI (Graphical User Interface), two GUI elements 401-402 (say a as two buttons), as known in the art.

Each one of the GUI elements 401-402 is associated with a respective predefined video length, as described in further detail hereinabove.

In the exemplary embodiment, each one of the GUI elements 401-402 is further associated with a respective predefined event type, as described in further detail hereinabove.

Further, each one of the GUI elements 401-402 is presented on the display of the mother's mobile phone, with a marking which indicates the association of the GUI element with the respective event type predefined for the GUI element.

Thus, in the example, per the predefined event types, during the game, a first GUI element 401 presented to the mother on her smart phone's display bears the word 'Goal', while a second GUI element 402 presented to the mother bears the word 'My boy' 402.

In the example, when one of the players scores a goal, the mother actuates (say by touching) the button which bears the word 'Goal', and a sub-portion made of the last twenty seconds of the ten minutes stored in the buffer maintained on the user's device, is forwarded by communication to the remote server computer.

When her son receives the ball, the mother actuates the button which bears the word 'My boy', and a sub-portion made of the last one minute of the video feed portion stored in the buffer, is forwarded by communication to the remote server computer.

Then, on the server computer, the sub-portion is further processed by conversion into a video clip, which is distributed automatically in an email message which bears a link usable for downloading the video clip from the server computer, to the mother and to one or more other recipients.

Optionally, the recipients are predefined by the mother on a dedicated web site, prior to the game, as described in further detail hereinabove.

Figure 5:
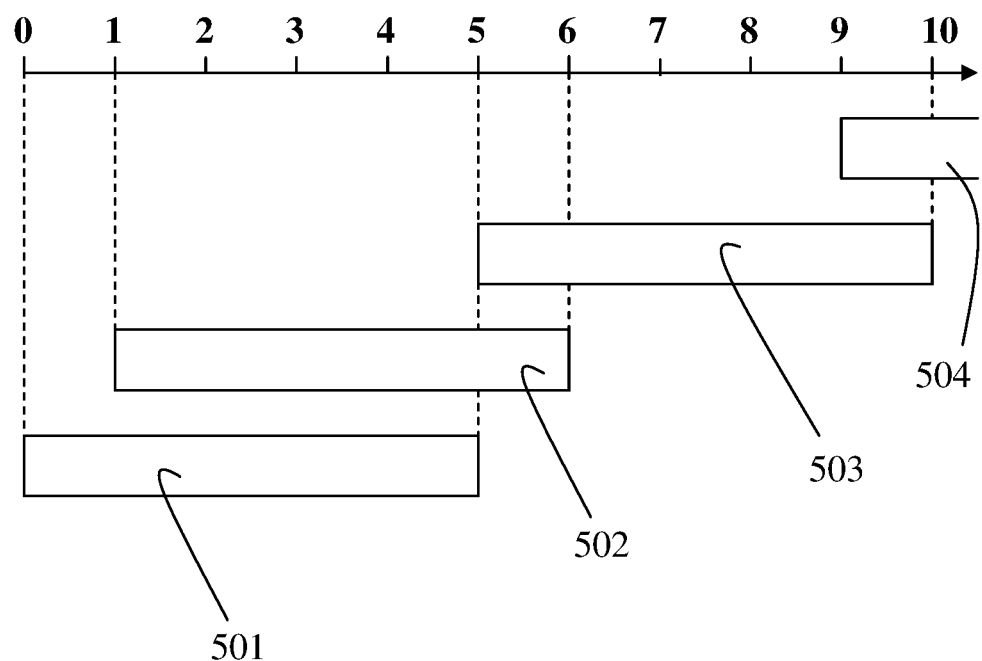

Reference is now made to FIG. 5, which is a block diagram schematically illustrating computer memory buffer usage in performing steps of event based video generation, according to an exemplary embodiment of the present invention.

According to an exemplary embodiment, throughout most of the receiving of the video feed, say by video feed receiver 110, there are maintained two buffers which span partially overlapping time frames of five minutes.

Thus, in one exemplary scenario, when a receipt 210 of a live video feed on a user's device starts, the buffer maintainer 120 opens a first buffer 501, and starts filling the buffer with the live video feed received 210 by the video feed receiver 110 (say with a sequential digital data representation of the feed's frames, as known in the art).

By the end of the first minute of the video feed, the buffer maintainer 120 opens a second buffer, and starts filling the second buffer too, with the live video feed received 210 by the video feed receiver 110 (starting with the second minute of the live video feed). The buffer maintainer 120 thus maintains the two buffers by updating both buffers simultaneously, for the next four minutes.

By the end of the fifth minute, the first buffer 501 is fully filled and stores minutes 1-5 of the video feed, whereas the second buffer 502 stores minutes 2-5 of the video feed (i.e. four minutes) with the last fifth of the second buffer 502 being empty.

At that point (i.e. at the end of the fifth minute of the receiving 210), the buffer maintainer 120 opens a third buffer 503, stops updating the first buffer (now filled) 201, and starts updating the third buffer 503, with the live video feed being received 210, simultaneously updating the second 502 buffer for the next one minute.

In the next three minutes (i.e. minutes 7-9 of the video feed), the buffer maintainer 120 maintains the third buffer 503 only.

By the end of the ninth minute, the third buffer 503 stores minutes 6-9 of the video feed (i.e. four minutes) with the last fifth of the third buffer 503 being empty At that point (i.e. at the end of the ninth minute), the buffer maintainer 120 opens a fourth buffer 504, starts updating the fourth buffer 504, with the live video feed being received 210, simultaneously updating the third 503 buffer for the next one minute, and so on and so forth, as long as the video feed receipt 210 continues.

In the exemplary scenario, thanks to the at least one minute long overlaps between the buffers (say for the video feed's second, sixth and tenth minute), any event of a length of up to one minute captured in the video feed may be forwarded per a user's actuation of one of the GUI elements presented by the GUI element presenter 130.

Even an event captured at the very beginning of one buffer may be forwarded, since the event is captured in a previous buffer's ending portion.

For example, when the user pushes the 'Attack' GUI element 314 presented by the GUI element presenter 130 during a second minute of the video feed's receipt 210 (say at the $72^{nd}$ second of the video feed), the second buffer 502 holds only the last twelve seconds.

However, thanks to the overlap, the first buffer holds the entire one minute of video length predefined for that GUI element 314, thus making the forwarding of the one last minute (going from the exact $72^{nd}$ second backwards) long sub-potion possible.

The longer the overlap between two buffers of concurrent maintenance, say by the buffer maintainer 120, the longer is the sub-potion's video length secured thanks to the overlapping.

Figure 6:
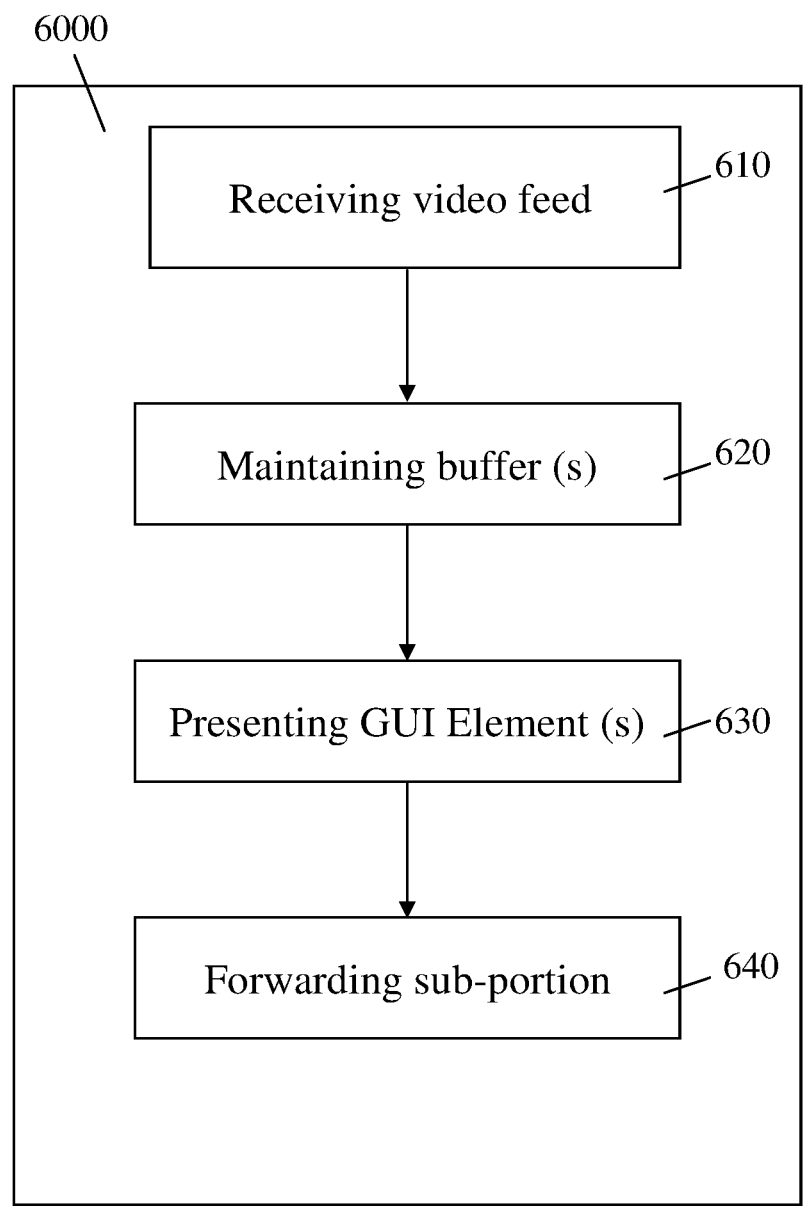

Reference is now made to FIG. 6 which is a block diagram schematically illustrating an exemplary computer readable medium storing computer executable instructions for performing steps of event based video generation, according to an exemplary embodiment of the present invention.

According to an exemplary embodiment of the present invention, there is provided a non-transitory computer readable medium 6000, such as a Micro SD (Secure Digital) Card, a CD-ROM, a USB-Memory, a Hard Disk Drive (HDD), a Solid State Drive (SSD), etc.

The computer readable medium 6000 stores computer executable instructions, for performing steps of event based video generation.

The instructions may be executed upon one or more computer processors, say on a computer processor of a device such as smart phone (say an Apple® iPhone or a Samsung® Galaxy cellular phone) or a tablet computer (say an Apple® iPad).

In a first example, for carrying out the steps, the device's computer processor communicates with one or more cameras (say with an action camera), for receiving a video feed captured live during a game of sport, a seminar, a lecture, a speech, etc., as described in further detail hereinabove.

In a second example, the video feed is rather captured by a user of the device, using a camera installed on the device itself (say a smart phone camera), as described in further detail hereinabove.

The computer executable instructions include a step of receiving 610 on the device, a feed of video captured by a camera—say a video feed which the user captures himself using a camera installed on the device (say the smart phone), a live video feed streamed wirelessly to the device from an action camera, etc.

The computer executable instructions further include a step of maintaining 620 one or more buffers on a memory of the device during the receiving 610 of the video feed, as described in further detail hereinabove.

At least one of the buffers stores a most recent portion of the video feed being received 610—say the last five minutes of video received 610, as described in further detail hereinabove.

Optionally, throughout at least a part of the receiving 610 of the video feed by there are maintained two buffers which span partially overlapping time frames, as described in further detail hereinbelow, and as illustrated by FIG. 5.

The computer executable instructions further include a step of presenting 630 one or more GUI (Graphical User Interface) elements—say radio buttons, check boxes, options in a menu, etc., as known in the art, to the user, on a display of the user's device, during the receipt 610, as described in further detail hereinabove.

Each one of the GUI elements is associated with a respective video length predefined by a user, a programmer, an administrator, etc., as described in further detail hereinabove.

The computer executable instructions further include a step of, upon actuation of one of the GUI elements by the user of the device (say by clicking or touching the GUI element), forwarding 640 a sub-portion of the video feed portion stored in one of the buffers for further processing, as described in further detail hereinabove.

The forwarded 640 sub-portion's has the video length associated with the GUI element actuated by the user, and predefined by the user, programmer, or administrator, etc., for the GUI element, as described in further detail hereinabove.

Thus, by actuating one of the GUI elements, the user implicitly or explicitly, chooses the size (say time length) of the video sub-portion forwarded 640 for further processing, as described in further detail hereinbelow.

Optionally, the sub-portion is forwarded 640 by communicating the sub-portion to a server computer remote from the device (say to a service provider's computer in remote communication with the user's device).

For example, the sub-portion may be communicated 640 over the internet or over another computer network, which the device accesses through a Wi-Fi connection, through a connection provided by a mobile carrier, etc., as known in the art.

In one example, the computer executable instructions further include a step of further processing the sub-portion by conversion into a content item such as a video clip.

Optionally, in the example, the computer executable instructions further include a step of distributing the video clip to one or more recipients directly from the server computer, using a recipients list predefined by the user through remote access to the server computer (say on a website), as described in further detail hereinabove.

Alternatively, the computer executable instructions further include a step of distributing the video clip indirectly, in an email message which bears a link usable for downloading the video clip from the server computer, and is sent to the user. The user in turn, may forward the email to one or more recipients, as described in further detail hereinabove.

Optionally, the sub-portion is rather forwarded 640 for further processing by presenting (say by the video presenter) on a screen of the user's device, thus playing the sub-portion of interest directly, to the user himself, as described in further detail hereinabove.

Optionally, the computer executable instructions further include a step of capturing of the video feed by the user himself, using the device's own camera, as described in further detail hereinabove.

Optionally, the computer executable instructions further include a step of controlling a camera (say an action camera) in communication with the user's device, say over a wireless connection, using a dedicated application—say a driver application installed on the user's device, as known in the art.

Optionally, the computer executable instructions further include a step of presenting 630 each one of the GUI elements with a marking which indicates an association of the GUI element with a respective event type, as described in further detail hereinabove.

Each one of the event types is predefined, for a specific one of the GUI elements, say by the user, administrator or programmer, as described in further detail hereinabove.

Thus, in one example, per the predefined event types, during a game of Soccer, one GUI radio button presented 630 to the user, bears the word 'Goal', one GUI radio button presented 630 to the user, bears the word 'Offside', one radio button presented 630 to the user, bears the word 'Attack ', etc., as described in further detail hereinabove.

In the example, when a player scores a goal which is captured in the video feed being received 610, the user may actuate the GUI radio button which bears the word 'Goal'. Upon the actuation of the radio button by the user, the a sub-portion made of the last twenty seconds of the video feed stored in the buffer, is communicated 640 to a remote server computer.

However, in the example, when the user rather actuates the GUI radio button which bears the word 'Attack', the a sub-portion made of the last one minute of the video feed stored in the buffer, is communicated 640 to the remote server computer.

Optionally, the computer executable instructions further a step of selecting one or more of the video lengths, one or more of the GUI elements, one or more of the event types associated with a respective one of the GUI elements, or any combination thereof, based on the device's location, on data input by the device's user, or on both.

Optionally, the computer executable instructions further include a step of allowing the user to define an association between at least one of the GUI elements and a respective video length.

Optionally, the computer executable instructions further include a step of allowing the user to define an association between at least one of the GUI elements and a respective event type.

Optionally, the computer executable instructions further include a step of receiving definition data which defines one or more of the video lengths, one or more of the GUI elements, one or more of the event types associated with a respective one of the GUI elements, or any combination thereof from a server computer remote from the device, as described in further detail hereinabove.

In one example, the computer executable instructions further include a step of forwarding data generated on the user's device based on a signal received by the user's device, to a server computer remote from the user's device, as described in further detail hereinabove.

The data generated based on the signal may include, but is not limited to: GPS (Global Positioning System) data, DGPS (Differential Global Positioning System) data, another location data, etc., or any combination thereof, as known in the art.

Consequently, on the remote server computer, based on the data forwarded to the server computer, the server computer generates definition data which defines one or more of the video lengths, one or more of the GUI elements, one or more of the event types associated with a respective one of the GUI elements, or any combination thereof.

The definition data generated on the server computer is sent by the server computer, to the user's device, received on the device, and forwarded for use in the presenting 630 of the GUI elements, in the forwarding 640 of the sub-portion (say for setting the sub-portion's length), or in both, as described in further detail hereinabove.

In a second example, the computer executable instructions further include a step of allowing the user to input a sport type, and based on the input sport type, automatically selecting one or more of the video lengths, one or more of the GUI elements, one or more of the event types associated with a respective one of the GUI elements, or any combination thereof, as described in further detail hereinabove.

In a third example, the computer executable instructions further include a step of allowing the user to input a code—say a code given to the user at a stadium at which a Football Match attended by the user takes place, and of forwarding the user-input code to a server computer remote from the device.

Consequently, on the remote server computer, there is generated definition data which defines one or more of the video lengths, one or more of the GUI elements, one or more of the event types associated with a respective one of the GUI elements, or any combination thereof.

The generated definition data is sent to the user's device, on the device, and is forwarded for use in the presenting 630 of the GUI elements, in the forwarding 640 of the sub-portion (say for setting the sub-portion's length), or in both the presenting 630 and the forwarding 640, as described in further detail hereinabove.

Optionally, the computer executable instructions further include a step of receiving from the remote server, a link usable for accessing the content item based on the sub-portion communicated to the server computer, and of allowing the user to forward the received link to one or more recipients, as described in further detail hereinabove.

Optionally, the content item (say the clip) is further based on video data received on the server computer from at least one second device in predefined proximity to the first device.

For example, the content may be based on the video sub-portion received on the server computer from the user's device, combined with a video sub-portion received from a second device which according to GPS data received from both devices, and a digital map available on the server computer, are both present simultaneously within an area of a same sport facility, say a same tennis stadium.

It is expected that during the life of this patent many relevant devices and systems will be developed and the scope of the terms herein, particularly of the terms "Computer", "Camera", "Smart Phone", "Tablet Computer", "Micro SD Card", "CD-ROM", "USB-Memory", "Hard Disk Drive (HDD)", "Solid State Drive (SSD)", and "Computer Processor", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computer implemented method of event based video generation, comprising:
    on a device being used by a user, receiving a feed of video captured by a camera;
    on a memory of the device, maintaining for the user, at least one buffer storing a most recent portion of the video feed being received, said maintaining comprising, during at least a part of said receiving of the video feed, maintaining at least two buffers, such that each first one of the at least two buffers being maintained, is spanning a time frame overlapping, but only partially, with a timeframe being spanned by a second one of the buffers, the time frame being spanned by the second buffer overlapping, but only partially, with the time frame being spanned by the first buffer;
    on a display of the device, presenting at least one GUI (Graphical User Interface) element, each one of the GUI elements being associated with a respective length of video to be forwarded from the buffer upon actuation of the GUI element by a user of the device; and
    upon actuation of one of the GUI elements by the user of the device, forwarding at least a sub-portion of the video feed portion stored in the buffer for further processing, the forwarded sub-portion having the video length associated with the GUI element actuated by the user.

2. The method of claim 1, wherein said forwarding comprises communicating the sub-portion to a server computer remote from the device.

3. The method of claim 1, wherein said further processing comprises presenting the forwarded sub-portion on a screen of the device.

4. The method of claim 1, further comprising capturing the video feed using a camera installed on the device.

5. The method of claim 1, further comprising capturing the video feed using a camera in communication with the device.

6. The method of claim 1, wherein said presenting comprises presenting each one of the GUI elements with a marking indicating an association of the GUI element with a respective event type.

7. The method of claim 1, further comprising a preliminary step of selecting at least one of a group consisting of at least one of the video lengths, at least one of the GUI elements, and at least one event type associated with a respective one of the GUI elements, based on a location of the device, on data input by the user of the device, or on both the location and the user input data.

8. The method of claim 1, further comprising a preliminary step of allowing a user to define an association between at least one of the GUI elements and a respective video length.

9. The method of claim 1, further comprising a preliminary step of allowing a user to define an association between at least one of the GUI elements and a respective event type.

10. The method of claim 1, further comprising a preliminary step of receiving data defining at least one of a group consisting of at least one of the video lengths, at least one of the GUI elements, and at least one event type associated with a respective one of the GUI elements, from a server computer remote from the device.

11. The method of claim 1, further comprising forwarding data generated on the device based on a signal received by the device to a server computer remote from the device, and receiving data generated based on the forwarded data, from the server computer, the received data defining at least one of a group consisting of at least one of the video lengths, at least one of the GUI elements, and at least one event type associated with a respective one of the GUI elements.

12. The method of claim 1, further comprising forwarding GPS (Global Positioning System) data generated on the device to a server computer remote from the device, and receiving data generated based on the forwarded GPS data from the server computer, the received data defining at least one of a group consisting of at least one of the video lengths, at least one of the GUI elements, and at least one event type associated with a respective one of the GUI elements.

13. The method of claim 1, further comprising forwarding DGPS (Differential Global Positioning System) data generated on the device to a server computer remote from the device, and receiving data generated based on the forwarded DGPS data from the server computer, the received data defining at least one of a group consisting of at least one of the video lengths, at least one of the GUI elements, and at least one event type associated with a respective one of the GUI elements.

14. The method of claim 1, further comprising allowing a user of the device to input a sport type, and based on the input sport type, automatically selecting at least one of a group consisting of at least one of the video lengths, at least one of the GUI elements, and at least one event type associated with a respective one of the GUI elements.

15. The method of claim 1, further comprising allowing a user of the device to input a code, forwarding the code input by a user to a server computer remote from the device, and receiving data generated based on the forwarded code from the server computer, the received data defining at least one of a group consisting of at least one of the video lengths, at least one of the GUI elements, and at least one event type associated with a respective one of the GUI elements.

16. The method of claim 2, further comprising receiving from the server computer, on the device, a link usable for accessing content based on the sub-portion communicated to the server computer, and allowing the user to forward the received link to at least one recipient.

17. The method of claim 2, further comprising receiving from the server computer, on the device, a link usable for accessing content based on the sub-portion communicated to the server computer and on video data received on the server computer from at least one second device determined to be in proximity to the device that the link is received on, and allowing the user to forward the received link to at least one recipient.

18. An apparatus for event based video generation, the apparatus being implemented on a device being used by a user and comprising:
 a video feed receiver, configured to receive a feed of video captured by a camera;
 a buffer maintainer, in communication with said video feed receiver, configured to maintain for the user, at least one buffer storing a most recent portion of the video feed being received, on a memory of the device, the maintaining of the at least one buffer by said buffer maintainer comprising, during at least a part of the receiving of the video feed by said video feed receiver, maintaining at least two buffers, such that each first one of the at least two buffers being maintained, is spanning a time frame overlapping, but only partially, with a timeframe being spanned by a second one of the buffers, the time frame being spanned by the second buffer overlapping, but only partially, with the time frame being spanned by the first buffer;
 a GUI element presenter, configured to present at least one GUI (Graphical User Interface) element on a display of the device, each one of the GUI elements being associated with a respective length of video to be forwarded from the buffer upon actuation of the GUI element by a user of the device; and
 a forwarder, in communication with said GUI element presenter and said buffer maintainer, configured to forward at least a sub-portion of the video feed portion stored in the buffer for further processing, upon actuation of one of the GUI elements by the user of the device, the forwarded sub-portion having the video length associated with the GUI element actuated by the user.

19. A non-transitory computer readable medium storing computer executable instructions for performing steps of event based video generation, on a device being used by a user, the steps comprising:
 on the device being used by the user, receiving a video feed captured by a camera;
 on a memory of the device, maintaining for the user, at least one buffer storing a most recent portion of the video feed being received, said maintaining comprising, during at least a part of said receiving of the video feed, maintaining at least two buffers, such that each first one of the at least two buffers being maintained, is spanning a time frame overlapping, but only partially, with a timeframe being spanned by a second one of the buffers, the time frame being spanned by the second buffer overlapping, but only partially, with the time frame being spanned by the first buffer;
 on a display of the device, presenting at least one GUI (Graphical User Interface) element, each one of the GUI elements being associated with a respective length of video to be forwarded from the buffer upon actuation of the GUI element by a user of the device;
 upon actuation of one of the GUI elements by the user of the device, forwarding at least a sub-portion of the video feed portion stored in the buffer for further processing, the forwarded sub-portion having the video length associated with the GUI element actuated by the user.

* * * * *